United States Patent [19]
Walker et al.

[11] Patent Number: 5,320,486
[45] Date of Patent: Jun. 14, 1994

[54] APPARATUS FOR POSITIONING COMPRESSOR LINER SEGMENTS

[75] Inventors: Roger C. Walker, Middletown; Christopher C. Glynn, Hamilton, both of Ohio

[73] Assignee: General Electric Company, Cincinnati, Ohio

[21] Appl. No.: 6,445

[22] Filed: Jan. 21, 1993

[51] Int. Cl.⁵ .............................................. F01D 25/24
[52] U.S. Cl. ................................... 415/139; 415/173.1
[58] Field of Search .............. 415/170.1, 173.1, 173.7, 415/139

[56] References Cited

U.S. PATENT DOCUMENTS

| | | |
|---|---|---|
| 2,834,537 | 5/1958 | Neary . |
| 2,915,280 | 12/1959 | Sonder . |
| 3,892,497 | 7/1975 | Gunderlock et al. ............... 415/139 |
| 4,573,866 | 3/1986 | Sandy, Jr. et al. ............... 415/173.1 |
| 4,759,687 | 7/1988 | Miraucourt et al. . |
| 4,854,122 | 8/1989 | Belling . |
| 4,866,942 | 9/1989 | Belling . |
| 4,944,151 | 7/1990 | Hovnanian . |
| 5,076,049 | 12/1991 | Von Benken et al. . |
| 5,080,557 | 1/1992 | Berger . |
| 5,088,888 | 2/1992 | Bobo . |
| 5,141,395 | 8/1992 | Carroll et al. . |
| 5,145,316 | 9/1992 | Birch ............................... 415/173.1 |
| 5,201,846 | 4/1993 | Sweeney ......................... 415/170.1 |

FOREIGN PATENT DOCUMENTS

| | | | |
|---|---|---|---|
| 629283 | 10/1961 | Canada .................................. 415/139 |
| 786689 | 11/1957 | United Kingdom ............... 415/139 |

Primary Examiner—Edward K. Look
Assistant Examiner—James A. Larson
Attorney, Agent, or Firm—Jerome C. Squillaro; Nathan D. Herkamp

[57] ABSTRACT

In a gas turbine engine, a system for maintaining uniform circumferential spacing between adjacent segments of a compressor liner, the liner segments being retained within an outer casing by a flanged connection. The system includes a T-shaped pin retained within the flanged connection radially and circumferentially by engagement with a slot formed in the outer casing, and axially by engagement with a notch formed in the adjacent liner segment, such that the liner segment overlaps the positioning pin. In a preferred embodiment, each liner segment is notched and held in place by a pin which, in turn, is retained within a slot in the compressor casing.

11 Claims, 3 Drawing Sheets

APPARATUS FOR POSITIONING COMPRESSOR LINER SEGMENTS

BACKGROUND OF THE INVENTION

The present invention generally relates to gas turbine engines, and more particularly, to the maintenance of compressor liner segment spacing.

A typical aircraft gas turbine engine includes a compressor for pressurizing air which subsequently is mixed with fuel and ignited in the combustor section with the resulting combustion gases powering the turbine. The compressor and turbine are surrounded by casings or liners through which air is either extracted or distributed.

In a typical compressor, an inner liner is concentric with a outer casing and mounts stator or variable vanes. The inner liner also surrounds the rotor blades of the compressor. The air generated by the compressor is at an extremely high temperature, therefore compressor liners are used to form an aerodynamic flowpath and to protect the casing structure from the flowpath environment.

The inner compressor liner is formed in segments around the circumference of the compressor. The liners are formed in two or more sections to eliminate large thermal stresses due to temperature differences between the casing and the liners. Because the liner is segmented, it allows recirculation leakage in between the segments which in turn reduces compressor performance. In order to reduce this leakage, spline seals are added between the liner segments.

Gap dimensions between the liner segments where the spline seals are located are determined by the thermal expansion of the liner segments. Because the gaps between the liner segments are required to be large to compensate for thermal close-down of the liner segments, keeping the spline seals engaged between the liner segments and functioning properly has become problematic.

In order to keep the liner segments in proper alignment, therefore maintaining the spline seals in between the liner segments, radial bolts have been previously used to fasten the liner segments to the outer casing. By fastening the liner segments to the outer casings, uniform spacing between the liners can be maintained. However, radial bolts require reinforcement on the outer casing and also on the liners to maintain structural integrity of the compressor. This additional reinforcement adds weight and complexity to the design, as well as making such liners more difficult to assemble and disassemble from the engine.

An alternate method of positioning liner segments is by forming a stop at the axial flange of each casing half in a circumferential groove in the casing which holds the liner segments. This method has also proven unsatisfactory in that forming a stop in the casing groove has required expensive machining operations, and also has proven to be inefficient.

Therefore, a need exists for an improved mechanism for maintaining uniform spacing between compressor liner segments that eliminates the aforementioned problems associated with radial bolts and casing stops. Further, there is a need for a segment liner spacing system in which the segments are relatively inexpensive to manufacture and easy to install.

SUMMARY OF THE INVENTION

The present invention is a system for positioning liner segments in the compressor casing of a gas turbine engine such that uniform spacing between the liner segments is maintained. The system of the present invention eliminates the need for reinforcement of the casings and liners, thereby reducing the overall weight and complexity of the compressor.

In a preferred embodiment, compressor liner segments include flanges on leading and trailing edges which are received within circumferential grooves formed in the compressor casing to mount the liner segments on the casing. A T-shaped pin is positioned in the casing groove to position each liner segment circumferentially. The pin includes a radially-extending boss which is received within a radial slot in the outer lip of the compressor groove, which retains the pin in the radial and circumferential directions. The liner segment immediately adjacent the pin includes a notch shaped to receive the pin so that the pin is restrained from axial movement. Substitution of the T-shaped pin for conventional bolts and reinforcement hardware reduces the weight and complexity of the liner segment mounting system.

Accordingly, it is an object of the present invention to provide a compressor liner segment positioning system for a turbine engine wherein a pin maintains the segments in a circumferentially spaced, uniform relationship during engine operation; a system that is lightweight and does not require reinforcement of the casings and liners; and a system that is relatively easy to manufacture and install.

These and other objects and advantages of the present invention will be better understood by reference to the following detailed description, the accompanying drawing and the appended claims.

DETAILED DESCRIPTION

Figure 1:
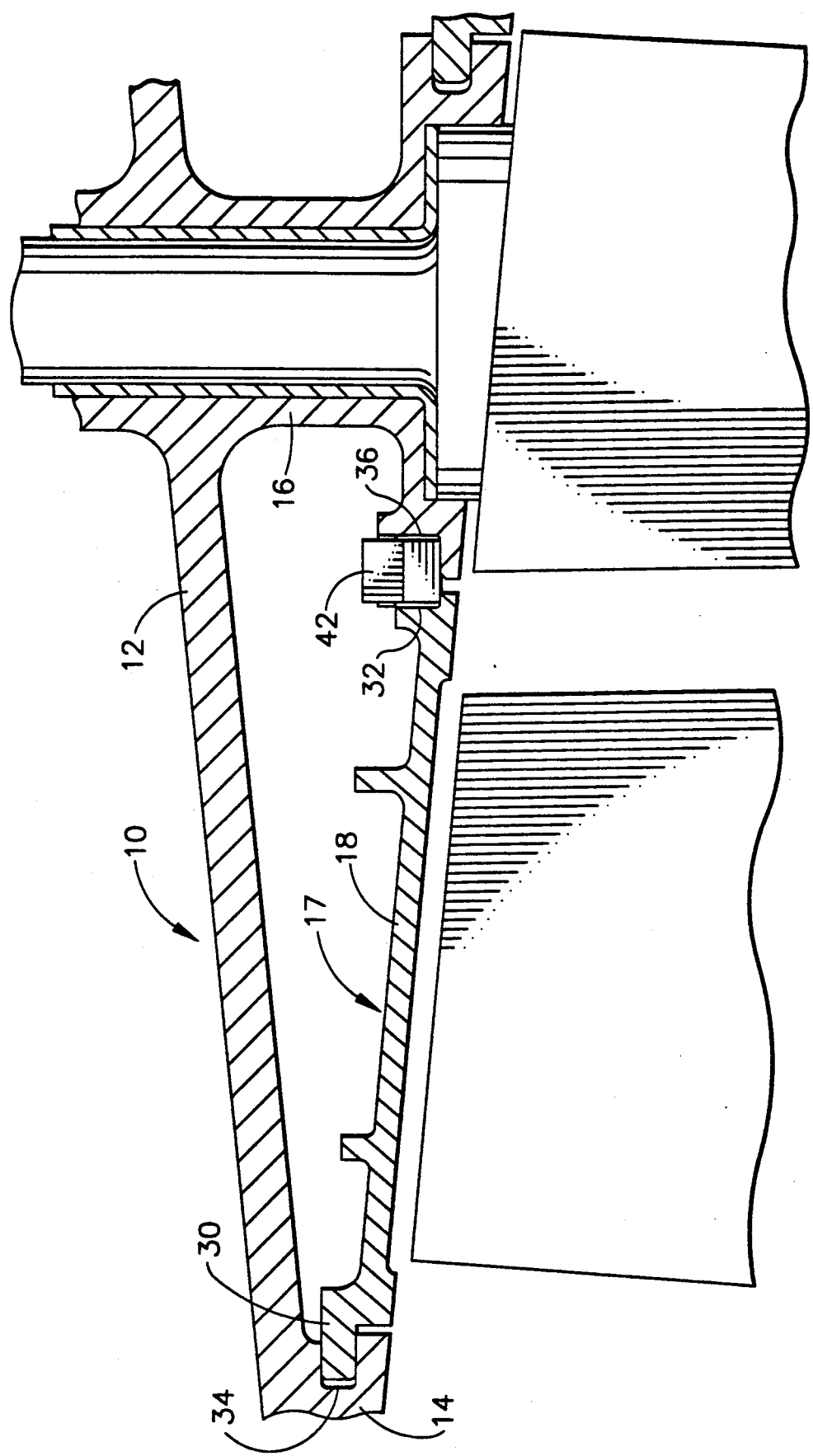
FIG. 1 is a detail side elevation in section of a compressor stage of a turbine engine illustrating the system of the present invention.
Figure 2:
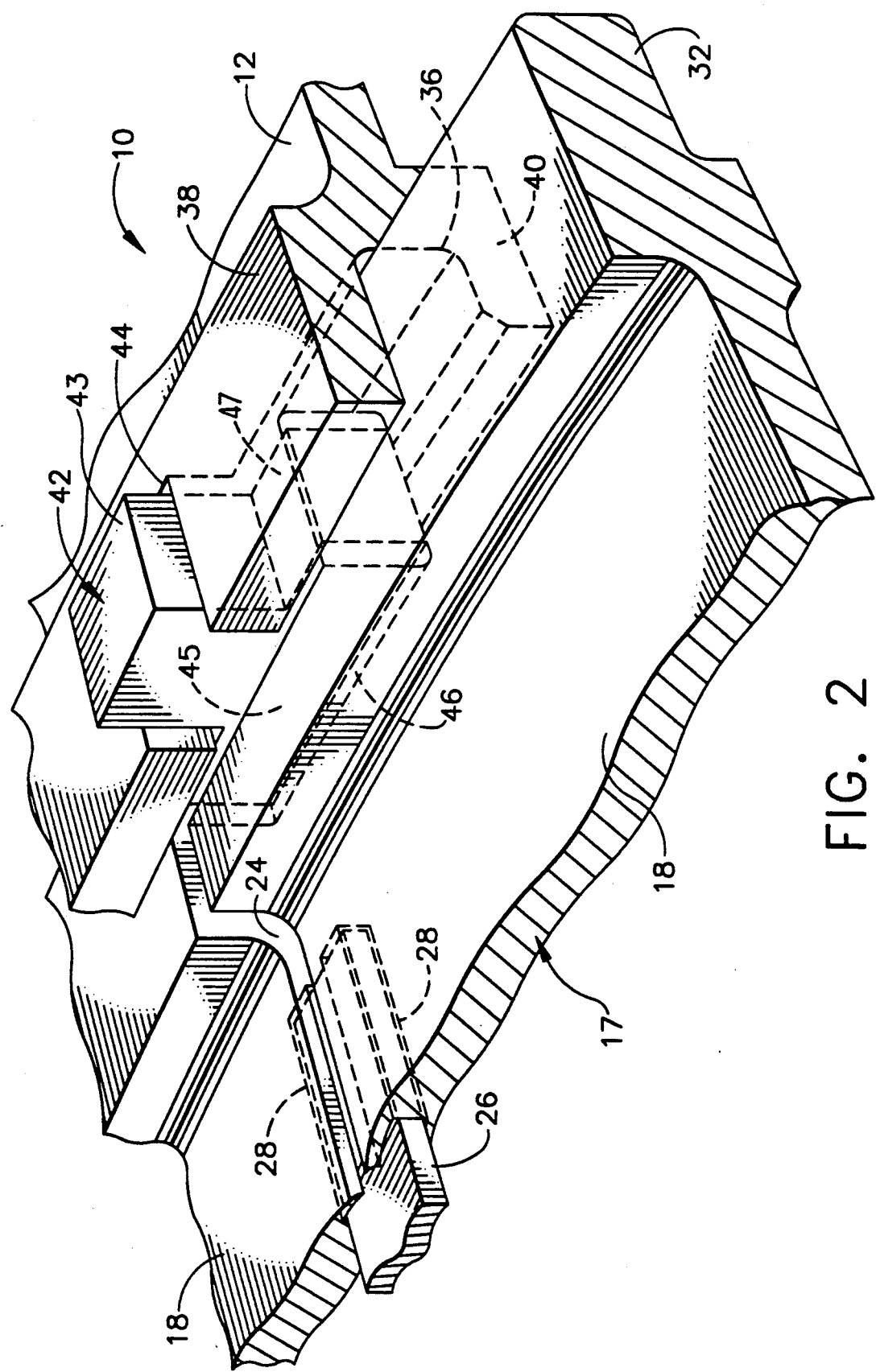
FIG. 2 is a detail perspective view of the system of FIG. 1.

A compressor stage of a gas turbine engine, generally designated 10 and shown in FIGS. 1 and 2, includes an outer casing 12 having side walls 14, 16 that extend radially inward toward a compressor liner, generally designated 17. The outer casing 12 extends circumferentially around the compressor 10 and is formed in half sections 20, 22 (see FIG. 3). The casing 12 has a flange at the ends of each section for securing the casing sections together.

Compressor liner 17 is comprised of axially-extending segments 18 spaced circumferentially about the compressor 10 within the outer casing 12. During operation of the compressor 10, heat is generated within the compressor which leads to thermal expansion of liner segments 18. Because the liner segments 18 thermally expand at a greater rate and magnitude than the casing 12 that contains them, the segments are sized to form gaps 24 between adjacent segments which allow the segments to move. Unfortunately, gaps 24 also allow unwanted recirculation leakage of compressor air to pass between compressor liner segments 18 and the outer casing 12.

To prevent recirculation leakage, spline seals 26 are placed between the liner segments (one of which is shown in FIG. 2). Spline seal 26 fits into cooperating slots 28 formed in the adjacent longitudinal edges of each liner segment. In order for the spline seals 26 to stay engaged between the liner segments 18 and function properly, the liner segments must be held in position circumferentially within the outer casing 12.

Each liner segment 18 includes flanges 30, 32 located along the leading and trailing edges, respectively, of the liner segment. Flanges 30, 32 are retained within grooves 34, 36, respectively, formed in side walls 14, 16. The connections between flanges 30, 32 and grooves 34, 36 retain the liner segments axially with respect to the outer casing 12. Groove 36 in side wall 16 is formed between outer casing ring 38 and inner casing ring 40. Flange 32 of liner segment 18 (FIG. 2) is positioned in groove 36 such that outer casing ring 38 extends over the outer surface of flange 32 and inner casing ring 40 extends over the inner surface of flange 32.

Figure 3:
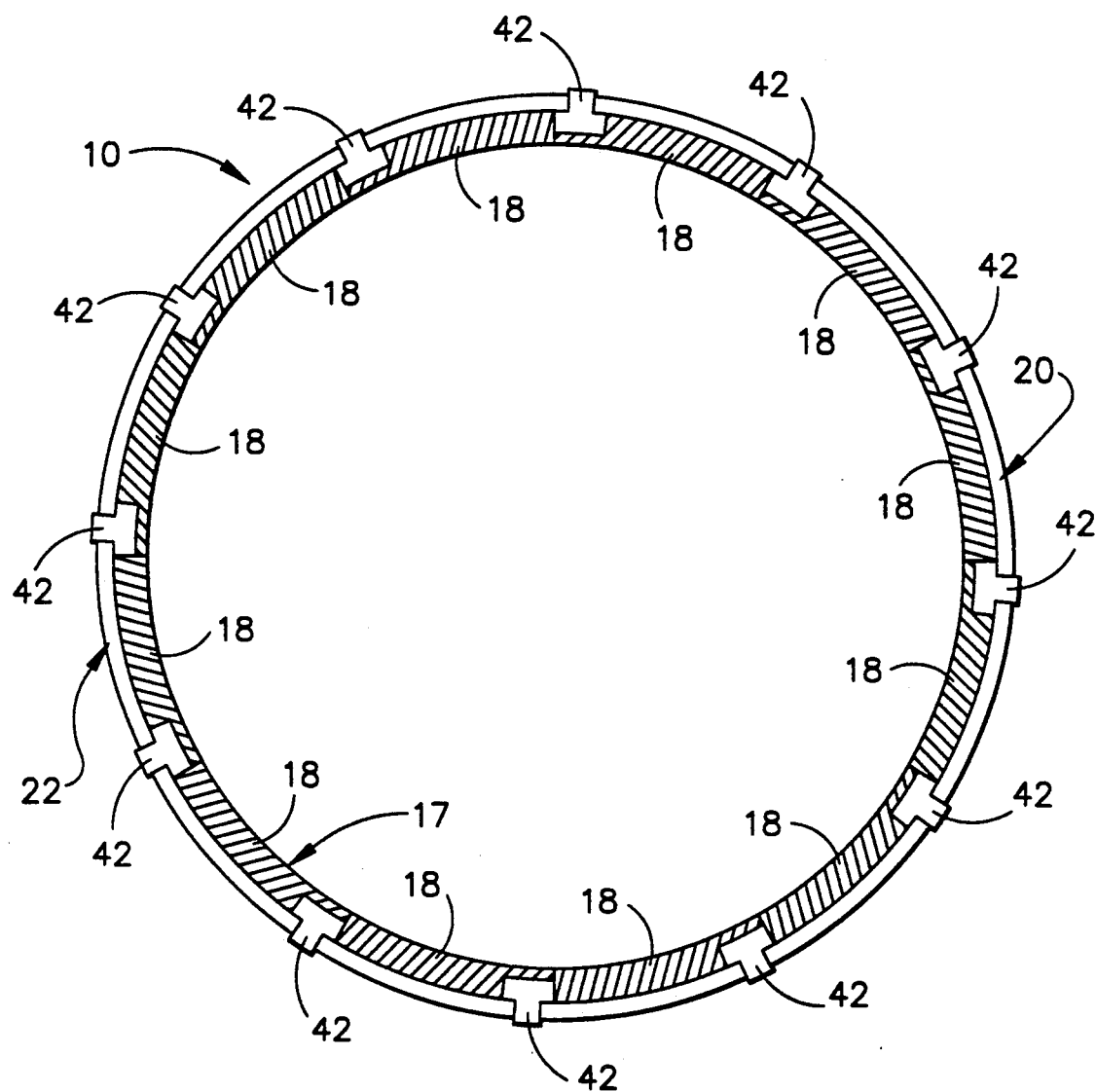
FIG. 3 is an end elevational view in section of the system of FIG. 1.

To position each liner segment circumferentially, T-shaped pins 42 are installed in casing groove 36 (see FIG. 3). Positioning pins 42 are located at the trailing ends of each liner segment 18 respectively. Each pin 42 includes a radially extending bar 43 and a body 45, wherein bar 43 extends radially outward from a radially outward facing surface 47 of body 45. Each pin is retained in the radial and circumferential direction by a slot 44, formed in upper casing ring 38, which receives bar 43. Each pin 42 is restrained axially by an adjacent liner segment 18, which restrains the pin 42 by receiving the body 45 of the pin within a corner notch 46 formed on the trailing edge of flange 32. Notch 46 is sized so that flange 32 overlaps the positioning pin 42 and receives body 45 with loose tolerances sufficient to allow for thermal expansion.

Consequently, pins 42 eliminate the need for bolted connections, and assembly of the liner 17 within the outer casing has been simplified. Assembly and positioning the segments 18 is accomplished by placing a first positioning pin 42 in a first slot 44 in the upper casing ring 38, then sliding a first liner segment 18 circumferentially into the casing groove 36 until notch 46 overlaps positioning pin 42. A spline seal 26 is then positioned within slot 28. A second positioning pin 42 is then placed in a second notch 44 and a second liner segment 18 is slid into groove 36 until notch 46 overlaps the pin. Spline seal 26 also engages slot 28 in liner segment 18. This sequence is repeated until all liner segments are circumferentially positioned within the compressor casing 12, with each pair of adjacent liner segments including a splined connection.

The preceding description has been presented with reference to a presently preferred embodiment to the invention shown in the drawings and specifically for compressor stages of a jet turbine engine. Workers skilled in the art and technology to which this invention pertains will appreciate that alterations and changes in the described structure can be practiced without departing from the spirit, principals and scope of this invention. Specifically, this invention is applicable to other stages of a turbine engine wherein liner segments are utilized to form an aerodynamic flowpath to protect the casing structure from the flowpath environment, such as in the turbine section of the jet engine.

What is claimed is:

1. In a gas turbine engine, a liner segment positioning system for maintaining uniform circumferential spacing between adjacent liner segments, said segments being retained within an outer casing by a flanged connection, said system comprising:
   pin means located within said flanged connection;
   means for retaining said pin means radially and circumferentially within said flanged connection;
   means for retaining said pin means axially within said flanged connection; and first and second liner segments which are circumferentially adjacent to one another;
   wherein said axially retaining means includes a corner notch formed in a trailing flange of said second liner segment, said pin means being disposed in said corner notch of said second liner segment and positioned circumferentially adjacent to said first liner segment.

2. The system of claim 1 wherein said pin means includes at least one pin, said pin being T-shaped and including a body and a radially extending boss, said boss extending radially outward from a radially outward facing surface of said body.

3. The system of claim 2 wherein said radial and circumferential retaining means includes a slot formed in said outer casing and wherein said boss extends radially outward through said slot.

4. The system of claim 1 wherein said corner notch is sized such that said second liner segment overlaps said pin means.

5. The system of claim 1 wherein said pin means includes a plurality of pins spaced about a circumference of said outer casing.

6. The system of claim 5 wherein said plurality of pins includes at least one pin engaging each of said liner segments.

7. The system of claim 6 further comprising spline seal means positioned between each of said liner segments.

8. The system of claim 7 wherein said segments comprise compressor liner segments.

9. A system for preventing recirculation leakage between adjacent compressor liner segments in a gas turbine engine comprising:
   first and second liner segments, each of said segments having a trailing flange retained within a grove formed inside walls of an associated compressor casing, said first liner segment being circumferentially adjacent to said second liner segment;
   a slot formed in said compressor casing;
   a corner notch formed in said second liner segment flange adjacent said slot; and
   a positioning pin located within said slot and said corner notch, whereby said pin is retained radially and circumferentially by said slot and said pin is retained axially by said corner notch, said pin being located circumferentially adjacent to said first liner segment.

10. A system for preventing recirculation leakage between adjacent compressor liner segments in a gas turbine engine comprising:
   first and second liner segments, each of said segments having a trailing flange retained within a groove formed in side walls of an associated compressor casing;
   a slot formed in said compressor casing;
   a notch formed in said second liner segment flange adjacent said slot; and a positioning pin located within said slot and said notch, whereby said pin is retained radially and circumferentially by said slot and said pin is retained axially by said notch;

wherein said pin is T-shaped, having a body retained within said notch and a radial boss retained within said slot.

11. The system of claim 10 further comprising spline seal means positioned between said first and second liner segments.

* * * * *